(12) United States Patent
Sharp

(10) Patent No.: US 11,758,900 B2
(45) Date of Patent: Sep. 19, 2023

(54) RODENT BARRIER AND METHOD OF USE

(71) Applicant: Thomas E. Sharp, Lake Stevens, WA (US)

(72) Inventor: Thomas E. Sharp, Lake Stevens, WA (US)

( * ) Notice: Subject to any disclaimer, the term of this patent is extended or adjusted under 35 U.S.C. 154(b) by 270 days.

(21) Appl. No.: 16/501,475

(22) Filed: Dec. 11, 2018

(65) Prior Publication Data
US 2022/0030849 A1   Feb. 3, 2022

Related U.S. Application Data

(60) Provisional application No. 62/708,542, filed on Dec. 11, 2017.

(51) Int. Cl.
*A01M 29/30* (2011.01)

(52) U.S. Cl.
CPC .................................... *A01M 29/30* (2013.01)

(58) Field of Classification Search
CPC .......... A01M 29/30; E04B 1/343; E04B 2/74; E04B 2/7401; B60J 11/00–10
See application file for complete search history.

(56) References Cited

U.S. PATENT DOCUMENTS

| | | | | |
|---|---|---|---|---|
| 3,889,736 A * | 6/1975 | Firks | .................... | G09F 15/0068 16/225 |
| 4,759,520 A * | 7/1988 | Levine | ..................... | A47G 5/00 40/539 |
| 5,522,409 A * | 6/1996 | May | ......................... | B60J 11/00 135/132 |
| 6,062,617 A * | 5/2000 | Marks | ...................... | B60J 11/06 293/128 |
| 6,367,423 B1 * | 4/2002 | Scheuer | ................ | A01M 29/30 297/219.1 |
| D560,072 S * | 1/2008 | Willis | ............................ | D6/332 |
| 2003/0150566 A1 * | 8/2003 | Ciano | ...................... | B60J 11/00 160/135 |
| 2004/0045214 A1 * | 3/2004 | Renzi | ........................ | E06B 7/28 43/124 |
| 2007/0166101 A1 * | 7/2007 | Scheu | ...................... | B60J 11/00 404/6 |
| 2013/0220557 A1 * | 8/2013 | MacAllen | ................. | E04B 2/74 160/84.01 |
| 2013/0312918 A1 * | 11/2013 | Trenkler | ............... | E04B 2/7405 160/136 |
| 2015/0202951 A1 * | 7/2015 | Henry | .................... | B60J 1/2091 296/154 |
| 2016/0221427 A1 * | 8/2016 | Robinson | .................. | B60J 11/04 |
| 2017/0071343 A1 * | 3/2017 | Garrett-Lindsey | ... | A01M 29/30 |
| 2018/0037101 A1 * | 2/2018 | Dick | ......................... | B60J 11/06 |

\* cited by examiner

*Primary Examiner* — Yvonne R Abbott-Lewis
(74) *Attorney, Agent, or Firm* — Schacht Law Office, Inc.; Michael R. Schacht

(57) ABSTRACT

A rodent barrier system includes a plurality of panels joined together into an enclosure surrounding a motor vehicle and preventing access to the vehicle by small rodents. The system includes a number of relatively flexible panels that can be bent to define corners of the enclosure. Each of the panels has a smooth outer surface that resists scaling by rodents. The panels also include attachment structures that aid in joining the panels together.

20 Claims, 6 Drawing Sheets

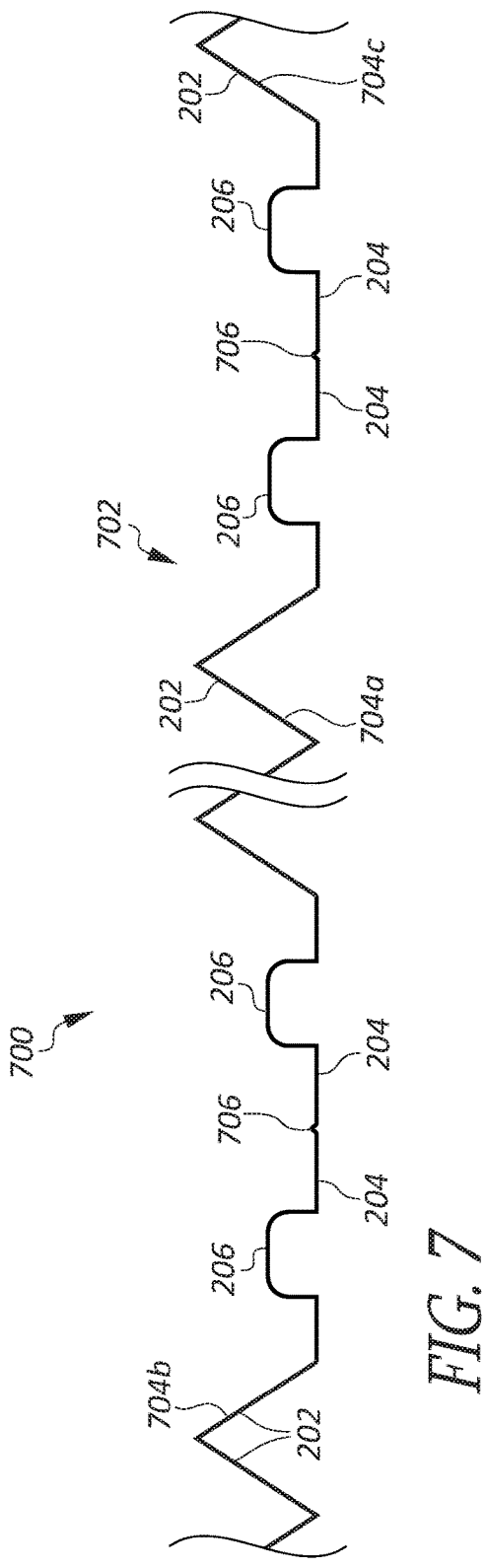

RODENT BARRIER AND METHOD OF USE

BACKGROUND

Technical Field

This disclosure is directed generally to systems configured to protect vehicles from damage by rodents to various components, including electrical wiring, carpets, insulation, hoses, etc. In particular, this disclosure is directed to such systems that serve as a barrier to prevent access by rodents to vehicles.

Description of the Related Art

Rodents are frequently responsible for damage to motor vehicles, particularly to wiring and other structures in the engine compartment. For example, mice and rats may be attracted to the vehicle interiors, including furniture, carpeting, and insulation, because they tend to associate human smells with food sources. Rodents may be attracted to vehicle engine compartments, with dark, tight spaces, which are easily accessible, and which provide safety from predators and shelter from weather. Wiring harnesses, hoses, and plastic components are frequently chewed by rodents for nesting material, often causing costly damage. This can be a problem whether a vehicle is parked inside a garage or out. While passenger vehicles are frequent targets, the problem is even greater in the case of vehicles that are not in regular use, such as, for example, extra cars and trucks, recreation vehicles (RVs), and farm machinery, particularly such machinery as may be used to harvest, collect, or transport edible crops. Such vehicles may sit for weeks or months, which allows rodents to work undisturbed, potentially causing much more damage before being discovered.

In recent years, many automobile manufacturers have begun using soy-based insulation on vehicle wiring harnesses, which is biodegradable. However, soy-based insulation is also an available food source that rodents will exploit when discovered. As a result, the incidence of rodent damage to vehicle wiring systems has increased. Some manufacturers now provide rodent-repellant tape, to be wrapped around vulnerable wiring, to reduce damage.

BRIEF SUMMARY

According to an embodiment, a rodent barrier system is provided, which includes a plurality of panels joined together into an enclosure surrounding a motor vehicle and preventing access to the vehicle by small rodents. The system includes a number of relatively flexible panels that can be bent to define corners of the enclosure. Each of the panels has a smooth outer surface that resists scaling by rodents. The panels also include attachment structures that aid in joining the panels together. The system can also include panels that are relatively rigid, which can be used to form straight portions extending between the corners of the enclosure.

According to an embodiment, each of the flexible panels includes a plurality of pleats extending vertically, and enhancing flexibility in one dimension while increasing stiffness in a perpendicular dimension.

According to an embodiment, the attachment structures include hook and loop fasteners that enable simple and quick coupling and decoupling of the panels.

According to another embodiment, the attachment structures include buttons, or protrusions, positioned on one panel and holes formed in an adjacent panel, the protrusions and holes being positioned and sized, relative to each other, so as to mate together.

BRIEF DESCRIPTION OF THE DRAWINGS

FIGS. 4, and 6-8 are cross-sectional plan views of portions of rodent barrier systems, according to respective embodiments.

DETAILED DESCRIPTION

Figure 1:
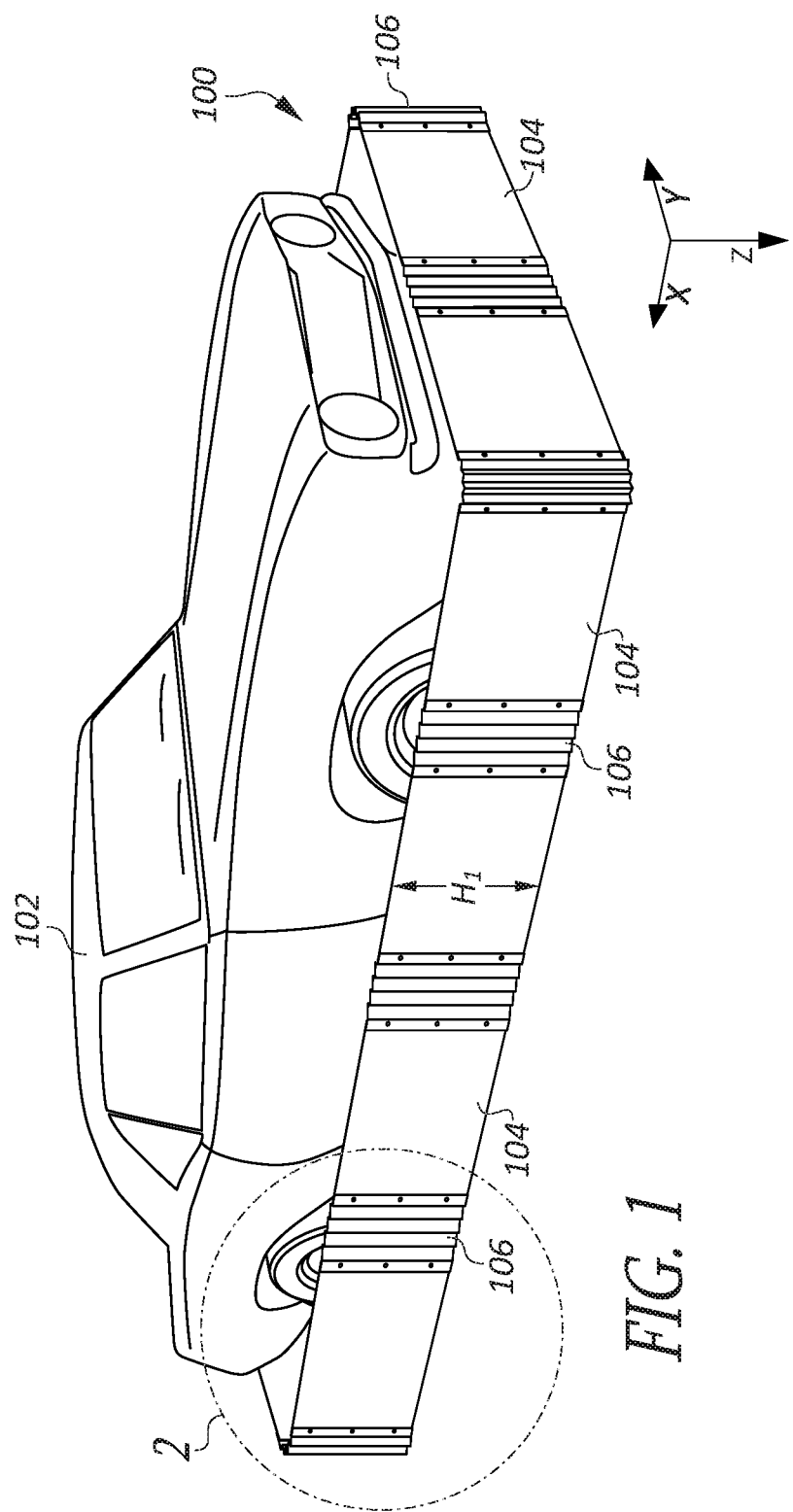
FIG. 1 is a perspective view of a rodent barrier system configured and arranged to protect a motor vehicle from entry of and damage by rodents, according to an embodiment.

In the following detailed description, reference is made to the accompanying drawings, which form a part hereof In the drawings, similar symbols typically identify similar components, unless context dictates otherwise. Other embodiments may be used and/or other changes may be made without departing from the spirit or scope of the disclosure.

The terms vertical and horizontal are used in the specification for convenience and clarity in the description of embodiments as they relate to the drawings. Vertical refers to a direction substantially parallel to the Z axis (See FIG. 1), while horizontal refers to a direction substantially parallel to the plane defined by the X and Y axes. The use of these terms in the description does not limit the claims in any way. Where such terms may be used in the claims, they are to be interpreted in accordance with the language of the claims to which they apply, without reference to their use in the description.

In some of the drawings, elements are designated with a reference number followed by a letter, e.g., "704a, 704b." In such cases, the letter designation is used where it may be useful in the corresponding description to refer to or differentiate between specific ones of a number of otherwise similar or identical elements. Where the description omits the letter from a reference, and refers to such elements by number only, this can be understood as a general reference to all the elements identified by that reference number, unless other distinguishing language is used.

Figure 2:
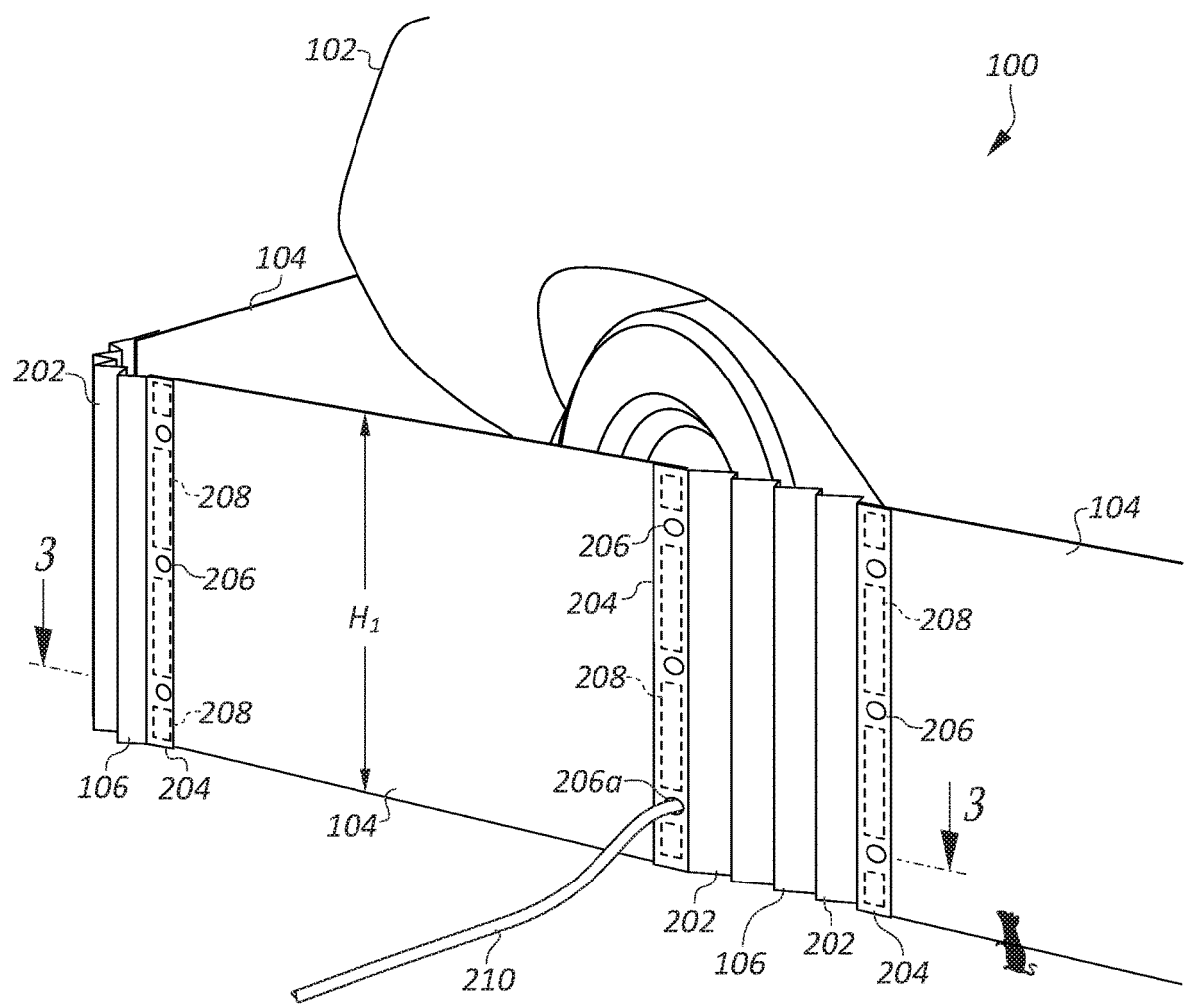
FIG. 2 is an enlarged detail of the portion of the rodent barrier system indicated at 2 in FIG. 1.
Figure 3:
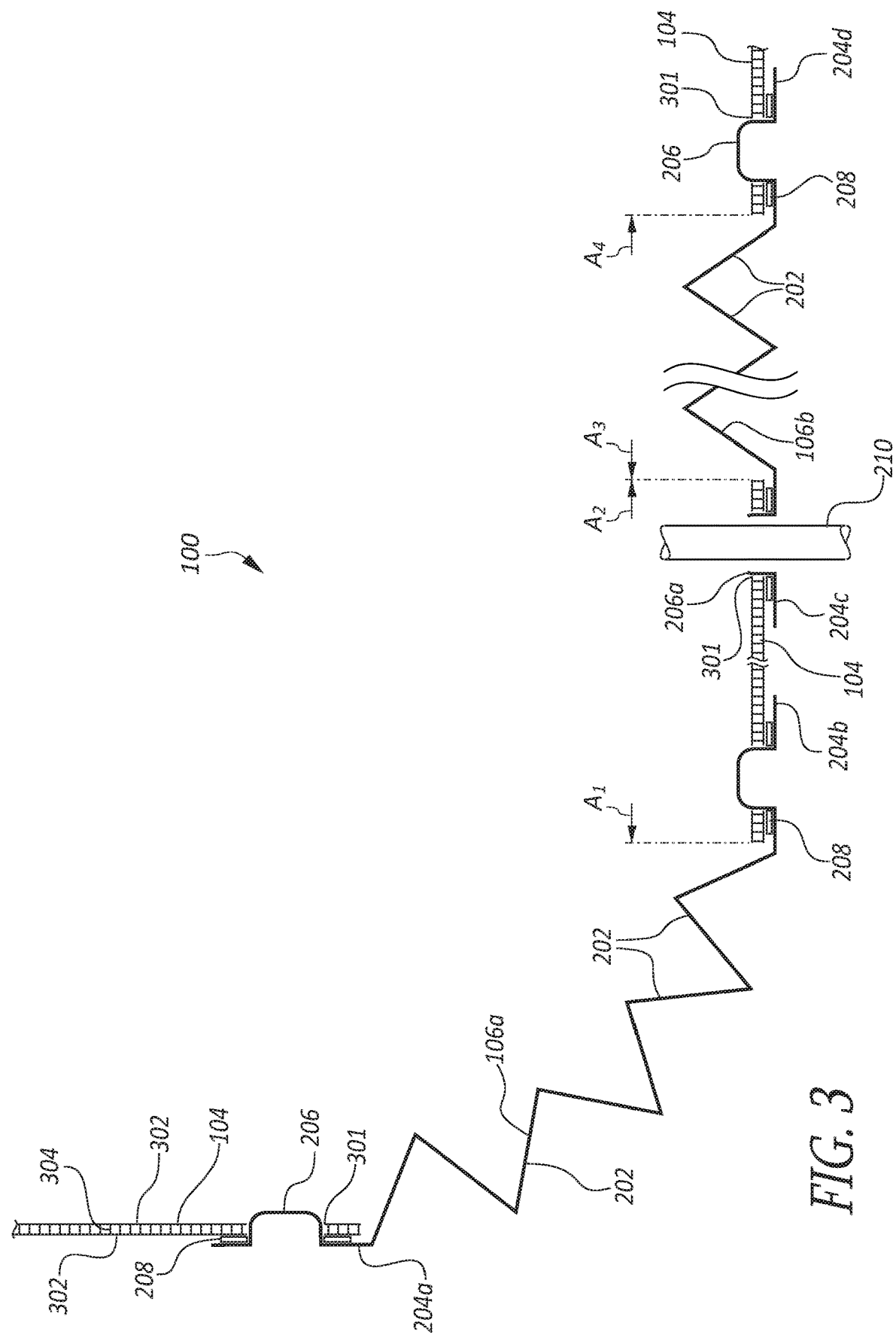
FIG. 3 is a cross-sectional plan view of the portion of the rodent barrier system shown in FIGS. 1 and 2, in a plane defined at 3-3 in FIG. 2.

FIG. 1 is a perspective view of a rodent barrier system 100 configured and arranged to protect a motor vehicle 102 from entry of and damage by rodents, according to an embodiment. FIG. 2 is an enlarged detail of the portion of the rodent barrier system 100 indicated at 2 in FIG. 1, while FIG. 3 is a cross-sectional plan view of the portion of the rodent barrier system 100 shown in FIG. 2, in a plane defined at 3-3 in FIG. 2.

The barrier system includes a plurality of rigid or semi-rigid panels 104 coupled edge-to-edge with flexible panels 106. The rigid and flexible panels 104, 106 are linked together in a continuous loop, forming an enclosure that is arranged on the floor or ground so as to completely surround the vehicle 102. The flexible panels 104 are relatively flexible in the horizontal direction, which enables them to be easily bent to form corners of the enclosure, but are relatively stiff or rigid in the vertical dimension, enabling them to maintain structural integrity. The materials and construction of the rigid and flexible panels 104, 106 are selected so as to resist climbing by small rodents. Additionally, vertical heights $H_1$ of the rigid panels 104 and flexible panels 106 are preferably approximately equal, and are selected to be adequate to discourage or prevent access to the protected vehicle by selected types of animals. For example, in many cases, the potential culprits are, primarily, mice and rats, so, according to one embodiment, the height $H_1$ is selected to be high enough to prevent mice and rats from entering the enclosed area.

In tests conducted by the inventor, it was found that mice cannot generally jump 12 to 14 inches, vertically. Thus, a barrier system 100 having a height $H_1$ of at least 14 inches will usually be sufficient to prevent most mice from jumping to the top of the panels and accessing a protected vehicle. Other rodents that are known to damage vehicles, such as rats, squirrels, and chipmunks, may be able to jump higher than 14 inches, so other embodiments are envisioned that include greater panel heights $H_1$. Squirrels, for example, are known to be capable of prodigious leaps, and so could presumable reach the top of even a two or three-foot barrier. However, squirrels typically do not engage is such acrobatics unless they are fleeing a predator or attempting to access a food source that is visible or otherwise detectable. This is particularly the case when the landing point is not visible from the point of take-off. Thus, an opaque barrier of 18-24 inches may be sufficient to discourage squirrels and other animals, even though they might be capable of leaping higher obstacles. On the other hand, an animal that has previous experience with vehicles may attempt to cross a barrier of a height that would otherwise be sufficient to prevent access. The inventor therefore contemplates various embodiments in which barriers of 12-48 inches, or more, are provided, depending upon the types animals that may be a threat, and their previous habits and behavior.

Each flexible panel 106 includes a plurality of vertical pleats, or folds, 202 zig-zagging between a pair of flanges 204. The pleats 202 provide stiffness in the vertical dimensions while maintaining flexibility in the horizontal dimension. The flanges 204 are provided with attachment structures configured to assist in coupling the flexible panels 106 to the rigid panels 104. In the embodiment shown in FIGS. 1-3, the attachment structures include a plurality of buttons, or protrusions 206 distributed along each flange 204, and adhesive elements 208 positioned between the buttons 206. Each button is positioned and configured to engage a corresponding hole 301 formed along an edge of a rigid panel 104. The adhesive elements 208 can be any appropriate material or structure configured to act to adhere a flange 204 to a rigid panel 104. According to an embodiment, the adhesive elements 208 include strips of hook-and-loop fastener pairs (e.g., Velcro®) coupled to the rigid and flexible panels 104, 106, respectively, such that the panels can be detached and reattached repeatedly. Other types of adhesive elements are also contemplated, including, for example, double-sided foam tape—which provides a more permanent attachment than the hook-and-loop material—and magnetic strips applied to one of the surfaces to be joined, and strips of a ferrous metal (or, alternatively, additional magnetic strips) attached to the other surface.

According to an embodiment, the flexible panels 106 are made from high-density polyethylene (HDPE) sheet material. HDPE typically has a smooth, waxy surface finish, which, in the tests conducted by the inventor, was found to be impossible for mice or rats to climb. The HDPE sheet material is, according to an embodiment, cut and vacuum formed to form the pleats 202 and flanges 204. The sheet material can be of any appropriate thickness—which may vary, depending upon a desired panel height $H_1$, in order to maintain a desired degree of rigidity and strength. According to an embodiment, a nominal thickness of the parent sheet material is between 0.020 and 0.080 inches. According to respective embodiments, the nominal thickness is 0.025, 0.040, and 0.060 inches.

The pleats 202 are defined by a plurality of vertical panels joined along their edges. The panels can have widths of, for example, 1.5 inches to around 3 inches, although other dimensions are also contemplated. The pleats 202 increase flexibility of the flexible panels 106 along their nominal length, horizontally, while stiffening the panels in the vertical direction. The pleats 202 of the flexible panels 106 also provide some conformability to the system, enabling small adjustments for irregularities in the planarity of the surface on which the system 100 is positioned.

Referring in particular to FIG. 3, it can be seen that the flexible panel 106a has been flexed such that vertical planes (i.e., perpendicular to the viewing plane) defined by flanges 204a and 204b are angled at approximately 90 degrees relative to each other. Meanwhile, vertical planes defined by flanges 204c and 204d of the flexible panel 106b are approximately coplanar. This is the case, even though the flexible panels 106a and 106b can have been manufactured from substantially identical parent stock, using the same tooling and processes, and having a substantially identical appearance prior to the assembly of the rodent barrier system 100.

For the purposes of the present disclosure and claims, the term flexible panel includes within its scope a panel that can be bent, along a first dimension through at least 90 degrees without causing damage or permanent structural change to the panel, while having a stiffness, in a second dimension, perpendicular to the first dimension, that is much greater than the stiffness of the panel in the first dimension.

According to an embodiment, the rigid panels 104 are made from corrugated plastic panels. Corrugated plastic panels are frequently used in the sign and display industries, and are sold under several trade names, including Coroplast®, Correx®, Polyflute®, etc. Corrugated plastic panels are typically made of extruded polypropylene, with front and back walls 302 connected by a plurality of parallel, spaced-apart webs 304 that extend in each panel between the front and back walls and that define parallel flutes that extend through the panels from one edge to an opposite edge. This structure gives corrugated plastic significant stiffness, particularly in the dimension perpendicular to the flutes. The panels are available in a variety of standard thicknesses, including 3 (mm), 4, 5, and 6, etc., and dimensions, including 18×24 (inches), 24×36, 30×36, 24×48, 48×96, etc.

According to an embodiment, the rigid panels 104 and the flexible panels 106 of the rodent barrier system 100 have a height $H_1$ of between 14 and 48 inches. According to respective embodiments, barrier systems with panels having heights $H_1$ of 16, 18, and 24 inches are also contemplated. These dimensions are advantageous because they can be cut from standard size sheets without waste. According to an embodiment, the rigid panels 104 have a length—between arrows $A_1$ and $A_2$ of FIG. 3—of about 48 inches, while the flexible panels 106 have a nominal length—between arrows $A_3$ and $A_4$ of FIG. 3—of about 10 to 12 inches. Thus, one rigid panel 104 and one flexible panel 106 have a combined length of about five feet, as measured between arrows $A_1$ and $A_4$ of FIG. 3. Accordingly, the overall dimensions of the enclosure can be modified in five-foot increments, by adding or removing one or more pairs of rigid and flexible panels 104, 106, to accommodate the size of vehicle. Of course, because of the pleated structure of the flexible panels 106, their length can be made to vary significantly from the nominal value, allowing a high degree of adjustability to the system, to permit smaller adjustments in dimensions and configurations, as needed.

Embodiments are also contemplated that include rigid panels 104 and/or flexible panels 106 with lengths that are different from the values described above. For example, according to various embodiments, rigid panels 104 are provided that have lengths of about 24, 32, and 36 inches, and flexible panels 106 that have nominal lengths of about 16, 18, and 24 inches. Furthermore, embodiments are contemplated in which panels of different lengths are included in a single system.

The buttons 206 serve to ensure that the bottom edges of the rigid and flexible panels 104, 106 are properly aligned during assembly. This is advantageous because rodents, particularly mice, are able to squeeze through very narrow passages. Misalignment of the panels may result in a gap under the bottom edge of the enclosure that is sufficient to permit entry by small rodents.

In the embodiment of FIGS. 1-3, each flange 204 includes three buttons 206 that are spaced equal distances apart, with an equal distances between the top button and the top of the flange and the bottom button and the bottom of the flange. Corresponding holes 301 are provided adjacent to each end of each rigid panel 104. This arrangement permits the rigid panels 104 to be attached to the flexible panels without regard for which edge is top or bottom, while maintain proper alignment of the panels.

According to one embodiment, the buttons 206 are sized and configured to fit into the corresponding holes 301 in the rigid panels 104 with an interference fit that is sufficiently tight as to securely attach the panels together. According to another embodiment, the buttons 206 serve primarily as alignment aids, while adhesive elements 208 are provided to provide a secure attachment. According to a further embodiment, the buttons 206 are omitted. Instead, the user manually aligns the edges during assembly.

Referring to FIGS. 2 and 3, a utility line 210 is shown passing through a button 206a and the corresponding hole 301 in the rigid panel. Many owners of campers and recreation vehicles provide utility hook-ups, such as water and/or electricity, even when the vehicles are not in use. This is typically to maintain power to appliances, such a refrigerator, heater, etc. If a utility line were passed over the top of the panels of the system 100, this would provide a path for rodents to gain access to the enclosure.

During the process in which the flexible panels 104 are formed, some portions of the panels are thinned significantly, relative to the original thickness of the parent sheet. This is particularly the case with the buttons 206, which may be less than half the original thickness. As a result, a user can easily cut the end off of a button 206 using a common utility knife. This opens a passage for a utility line that would be very difficult for a rodent to enlarge by knawing. According to an embodiment, a diameter of the buttons in established so as to be at least slightly greater than the male end of a common garden hose, i.e., about one inch. An opening of this size will also accommodate the plug end of many common extension cords. While a water hose or power cable is positioned within the opening, the remaining space is generally too small even for most mice to pass. Thus, by cutting a portion of the end off of one or more of the buttons 206, a user can provide a passage for electrical and water connections that rodents cannot easily exploit. Furthermore, the material of both the rigid panels 104 and the flexible panels panels 106 can be cut with a sharp knife, such as, e.g., a utility knife, so a user can enlarge the holes as necessary to admit a larger utility line 210.

According to an alternate embodiment, the diameter of the buttons 206 is large enough to accommodate the female end of a common garden hose, i.e., between about 1.35 and 1.5 inches. An opening of this size will accommodate larger hoses, and also most common three-prong extension cord plugs. Other size buttons are also contemplated, to accommodate other sizes of utility lines and connectors.

Figure 4:
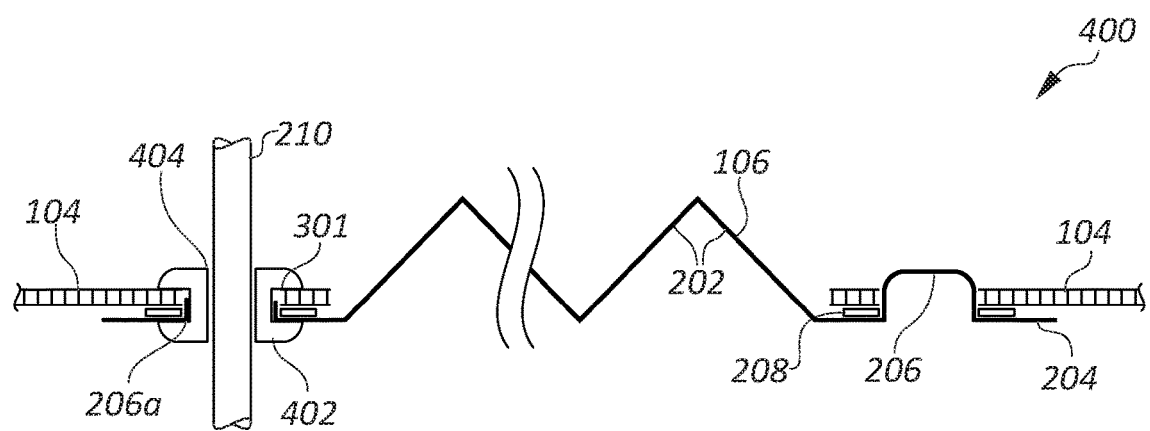
Figure 5:
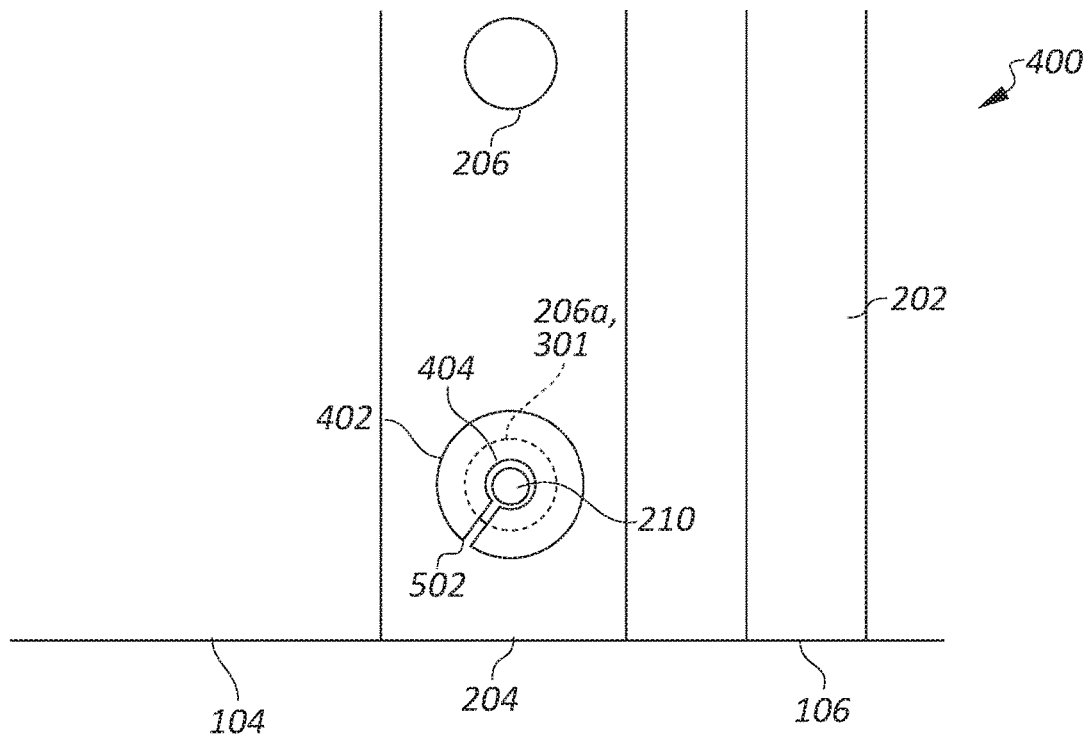
FIG. 5 is a front elevation view of the portion of the rodent barrier system shown in FIG. 4.

In embodiments in which the diameter of the buttons 206 is relatively large, when a user cuts away the end of a button, then positions a relatively small utility line therein, the remaining space may be sufficient to admit a smallish mouse. FIG. 4 is a cross-sectional plan view of a portion of a rodent barrier system 400, according to an embodiment, while FIG. 5 is a front elevation view of the portion of the rodent barrier system 400 shown in FIG. 4. In most respects, the barrier system 400 is similar to the system 100. However, the system also provides one or more grommets 402 sized and configured to fit into the hole remaining when most of the button 206a is cut away. The grommet is made of natural or synthetic rubber, or other appropriate elastomeric material, and includes a slit 502.

To install, the user first cuts the end of the button 206a away and introduces an end of the intended utility line, such as, e.g., the plug end of a power cord. The user then twists the grommet 402 to open a slit 502 and passes the slit over the utility line 210 so that the utility line passes through the central opening 404 of the grommet. The user then slides the grommet 402 along the utility line 210 toward the hole passing through the button 206a. The user then forces the grommet 410 into the opening, around the utility line 210, until a portion of the grommet is inside the hole, with additional portions outside the hole on opposite sides of the barrier, as shown in FIG. 4. This effectively fills most of the open space, blocking the passage to small rodents.

FIG. 6 is a cross-sectional plan view of a portion of a rodent barrier system 600, according to an embodiment. The barrier system 600 includes rigid panels 104 and flexible panels 602, substantially as described in previous embodiments. However, flanges 604 of the flexible panels 602 do not include the buttons described previously. Instead, channels 606 are provided, extending vertically the entire height of the flanges. The channels 606 are sized to receive an adhesive elements 208. During assembly, the adhesive element 208 is positioned in the channel 606 of a flange 604, and the end of a rigid panel 104 is positioned in contact with the adhesive element, coupling the respective rigid and flexible panels together. A depth of the channels 606 is equal to, or slightly less than a separation distance imposed by the adhesive elements, so that when the panels are assembled, only a very narrow gap, if any, remains between them.

As previously noted, the adhesive elements 208 can include any of a variety of attachment structures, including, for example, hook-and-loop fasteners, double-sided foam tape, magnetic closures, etc. Furthermore, combinations of different types of structures can be used.

Because the embodiment of FIG. 6 does not include structures that automatically align adjacent panels—such as the buttons described with reference to other embodiments, the user aligns the bottoms of the panels 104, 602 during assembly to eliminate spaces that might permit a small rodent to pass.

FIG. 7 is a cross-sectional plan view of a portion of a rodent barrier system 700, according to an embodiment. The system 700 includes a plurality of flexible panels 704 that are formed as a continuous integral strip 702 of panels. Adjacent edges of the flanges 204 are joined along their height, and a score line 706 extends between them. A user has the option of cutting the panels 704 apart at the score lines 706 and using the individual panels substantially as described with reference to other embodiments. Alternatively, the user can leave two or more of the panels 704 together, and use them without an intervening rigid panel. Such an arrangement may be useful to make up a remaining distance in the enclosure that is much shorter than a single rigid panel, or in a situation where it is desirable to negotiate an obstacle that requires flexibility along a longer distance than can be done with a single flexible panel.

FIG. 8 is a cross-sectional plan view of a portion of a rodent barrier system 800, according to an embodiment. The barrier system 800 includes rigid panels 104 and flexible panels 802, substantially as described in previous embodiments. However, flanges 804 of the flexible panels 802 do not include the buttons described previously. Instead, simple holes 806 are provided, distributed along the height of the flanges in positions corresponding to the positions of the holes 301 in the rigid panels 104. Plastic snap rivets 808 are positioned in the respective holes 806, 808, holding the panels together. The snap rivet shown in FIG. 8 is provided as an example, but there is a very large number of fasteners, both metal and plastic that can be used for this purpose, including, for example, nuts and bolts, pop-rivets, many different types of automotive fasteners, spring clips, etc.

Figure 9:
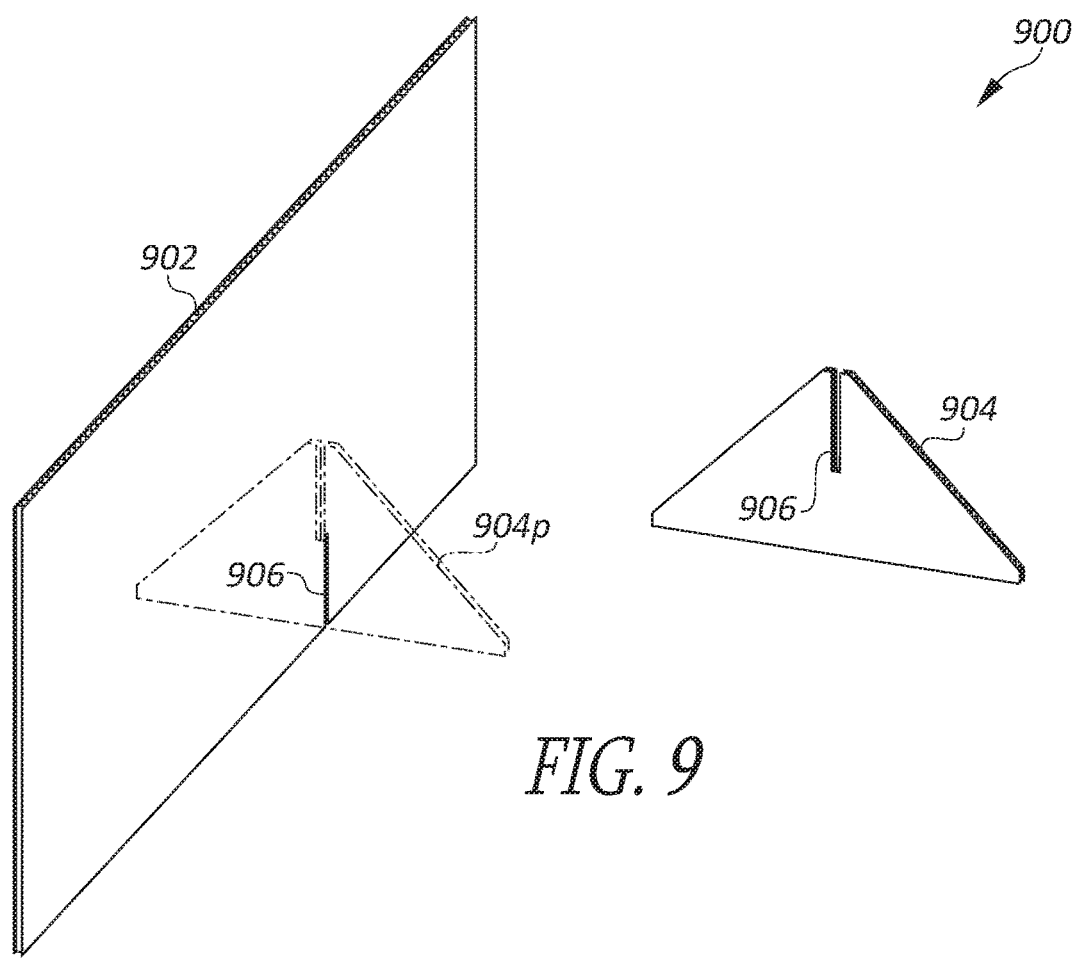
FIG. 9 is a perspective view of a portion of a rodent barrier system, according to an embodiment.

Typically, when a rodent barrier system is used with a passenger vehicle, or small truck, the flexible panels at the corners are sufficient to hold the walls of the system in a vertical position. However, in some cases, particularly where walls of the enclosure extend a significant distance between corners, the walls may tend to sag, i.e., rotate away from a vertical position. FIG. 9 is a perspective view of a portion of a rodent barrier system 900, according to an embodiment, that includes a rigid panel 902 and a structural brace 904 configured to reduce or prevent tipping of enclosure walls. The panel 902 and brace 904 each have a respective slot 906. When the slots 906 of the panel 902 and brace 904 are interlocked with each other, the brace is held in the position shown in phantom lines at 904*p,* relative to the panel. In this position, the brace acts to support the panel 902 and hold it in a vertical orientation. According to an embodiment, one or more braces 904 are positioned or distributed along the lengths of the walls of the enclosure of the barrier system 900 at intervals that are sufficient to support the walls and substantially prevent rotation away from the vertical.

Figure 10:
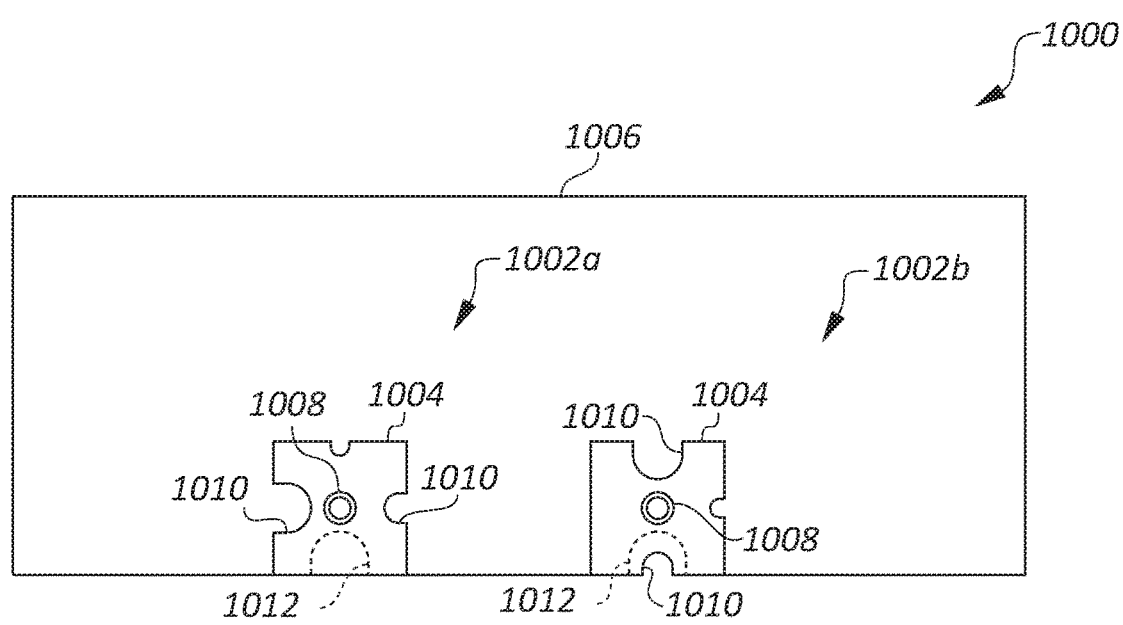
FIG. 10 is a front elevation view of a portion of a rodent barrier system, according to another embodiment.

FIG. 10 is a front elevation view of a portion of a rodent barrier system 1000, according to another embodiment, that includes utility passage mechanisms 1002 configured to permit the passage of utility lines across a barrier while preventing access by rodents. In the embodiment shown, each mechanism 1002 includes a notch plate 1004 rotatably coupled to a rigid panel 1006 of the barrier system 1000 by a pivot 1008 and having a plurality of notches 1010 of different sizes, each configured to accommodate a different sized utility line. The panel 1006 includes corresponding notches 1012—shown in hidden lines—positioned to align with any notch 1010 that is positioned at the bottom of the corresponding notch plate 1004. In use, the user rotates the notch plate 1004 to a position in which the appropriately sized notch 1010 is at the bottom, as shown with the utility passage mechanism 1002*a*. Alternatively, as shown with the utility passage mechanisms 1002*b,* the user can position the notch plate 1004 so that a blank side of the notch plate is downward, which closes the notch 1012 of the panel 1006 to prevent entry of rodents via the notch 1012.

The pivot 1008 can be any appropriate mechanism or device, including, for example, a nut, bolt, and washers, a pop-rivet, metal or plastic rivets, automotive fasteners, etc.

Embodiments are described above in which flexible and rigid panels alternate around the enclosure of a rodent barrier system. According to another embodiment, where a straight length of the enclosure is greater than the length of a single one of the rigid panels, two or more of the rigid panels are coupled in series, by, for example, double-sided foam tape, hook-and-loop fastening tape, etc., to provide the necessary length of rigid panels between flexible panels at the corners of the enclosure.

In some cases, it may be necessary to position a rodent barrier system on a surface that is susceptible to burrowing of local rodents. In such cases, it may be beneficial to dig a narrow trench to a depth of six or more inches, in which the barrier system is positioned, after which the trench is backfilled. Most burrowing rodents do not burrow deeper than about four to six inches, so sinking the system to at least that depth will discourage efforts to burrow under the panels of the system. In such systems, if the user wishes to be able to move a vehicle, one or more of the panels can be cut shorter or attached with an offset equal to the depth at which the remaining panels are buried, to permit the enclosure to be opened without completely removing panels from the ground. If necessary, the user can employ other structures to prevent burrowing at the opening of an enclosure, such as, e.g., anchoring wire mesh to the ground, etc. Where a rodent barrier system is to be buried some distance below the surface, the height of the system should be sufficient to allow panels of the system to extend an appropriate height above ground.

In circumstances where a rodent barrier system may be subject to relatively high winds, it may be advantageous to anchor the system to the ground. There are a number of ways contemplated to accomplish this. For example, a user can distribute weights around the inside of the enclosure and close to the panels, and attach elastic shock cords between the weights and the top of the panels. Alternatively, tent pegs can be driven into the ground close to the panels, with shock cords extending from the top of the panels to the pegs. As another alternative, sections of thin rod or stiff, heavy wire can be driven into the ground at regular intervals along the perimeter, and the rigid panels of the system positioned so that one or two of the sections of rod extend into respective flutes of each of the panels.

When a user wishes to move a vehicle that is positioned within a rodent barrier system, it is only necessary to separate the connection between one pair of rigid and/or flexible panels, then fold enough of the system aside to permit the vehicle to be driven from the enclosure. If the size of the enclosure and the conditions within are such that rodents might enter and be hidden therein during the absence of the vehicle, it may be advisable for the user to close the enclosure after removing the vehicle. Otherwise, it can remain open until the vehicle is returned.

As noted in the background section, some manufacturers provide rodent-repellant tape, designed to be wrapped around vulnerable wiring and hoses. While such tape does apparently significantly reduce damage by rodents, the tape is relatively expensive, and very labor intensive to install, inasmuch as each hose and wire harness must be completely wrapped, to discourage rodents. This can be very difficult, particularly in the tight and remote spaces that rodents most favor. Furthermore, the tape does not prevent rodent damage to other structures, such as thermal insulation, plastic covers, elastomeric seals, etc. Finally, the rodent repellent tape would seem to defeat the purpose of the original biodegradable wire insulation, inasmuch as the tape is apparently not biodegradable (nor recyclable), and once the wiring is covered with the tape, the original insulation will probably not readily biodegrade. On the other hand, in embodiments of the invention that include HDPE and/or polypropylene panels, both of these types of plastic are commonly recycled.

While embodiments have been described that include panels made from HDPE and/or polypropylene, these are merely examples of materials that can be used, and the claims are not limited to specific materials except where such limitations are explicit therein. Other materials can also be used, including other plastics, including polystyrene and polycarbonate, as well as naturally occurring materials, such as wood or other plant-based materials, metals, etc.

Embodiments have been described with reference to their use in protecting vehicles from rodent damage. However, embodiments are contemplated in which rodent barrier systems are employed to prevent access by rodents or other small animals to other kinds of objects or materials, such as, e.g., consumer goods, food stores, stacked boxes, etc., that may be standing in an open space, such as a garage, basement, or warehouse. Alternatively, such systems can be used to prevent access to loading docks or entry areas of facilities such as restaurants, hospitals, and shipping facilities, etc.

Reference throughout this specification to "one embodiment" or "an embodiment" and variations thereof means that a particular feature, structure, or characteristic described in connection with that embodiment is contemplated as part of at least one embodiment. However, phrases such as "in one embodiment" or "according to an embodiment," as used throughout this specification do not necessarily all refer to the same embodiment. Furthermore, individual features, structures, or characteristics described with reference to separate embodiments may be combined to form additional embodiments. Additionally, aspects of the embodiments can be combined with other, currently known or later-developed systems to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments on which the claims read, along with the full scope of equivalents to which such claims are entitled. Accordingly, the claims are not limited by the disclosure.

The abstract of the present disclosure is provided as a brief outline of some of the principles of the invention according to one embodiment, and is not intended as a complete or definitive description of any embodiment thereof, nor should it be relied upon to define terms used in the specification or claims. The abstract does not limit the scope of the claims.

The invention claimed is:

1. A rodent barrier system for inhibiting access by rodents to a predefined area of the ground, comprising:
   at least one flexible panel defining first, second, third, and fourth flexible panel edges and having a plurality of pleats extending between the first and second flexible panel edges, where each second flexible panel edge is opposite a corresponding first flexible panel edge, each fourth flexible panel edge is opposite a corresponding third flexible panel edge, and each third flexible panel edge is adapted to be supported adjacent to the ground;
   a first flexible panel flange formed at each third flexible panel edge;
   a second flexible panel flange formed at each fourth flexible panel edge;
   at least one flexible panel attachment structure positioned on each of the first and second flexible panel flanges; and
   at least one rigid panel defining first, second, third, and forth rigid panel edges, where each second rigid panel edge is opposite a corresponding first rigid panel edge, each fourth rigid panel edge is opposite a corresponding third rigid panel edge, and each third rigid panel edge is adapted to be supported adjacent to the ground; wherein
   at least one flexible panel attachment structure engages one of the first and second rigid panel edges to couple at least one flexible panel to at least one rigid panel to form the rodent barrier system; and
   the rodent barrier system is arranged such that each third flexible panel edge and each third rigid panel edge are supported adjacent to the ground to inhibit passage of rodents into the predefined area.

2. The rodent barrier system of claim 1, comprising at least one rigid panel attachment structure positioned adjacent to each of the first and second rigid panel edges, wherein at least one flexible panel attachment structure engages at least one rigid panel attachment structure to couple at least one flexible panel to at least one rigid panel to form the rodent barrier system.

3. The rodent barrier system of claim 2 comprising at least first and second flexible panels, where at least one flexible panel attachment structure of the first flexible panel engages the first rigid panel edge and at least one flexible panel attachment structure of the second flexible panel engages the second rigid panel edge to couple the first and second flexible panels to at least one rigid panel to form the rodent barrier system.

4. The rodent barrier system of claim 3 wherein:
   at least one flexible panel attachment structure comprises a coupling element, and
   at least one rigid panel attachment structure comprise at least one coupling hole formed in the at least one rigid panel adjacent to at least one of the first and second rigid panel edges; wherein
   each coupling hole receives at least one coupling element to secure a portion of one of the flexible panels to a portion of one of the rigid panels.

5. The rodent barrier system of claim 4, further comprising:
   at least one snap rivet;
   wherein the coupling element includes at least one flange opening formed in one of the of the first and second flexible panel flanges; wherein
   each snap rivet engages the flange opening and one of the coupling holes.

6. The rodent barrier system of claim 4, wherein the coupling element includes an attachment button extending from at least one of the of the first and second flexible panel flanges, where each attachment button engages one of the coupling holes.

7. The rodent barrier system of claim 4, further comprising:
at least one grommet hole formed by removing one of the coupling elements; and
at least one grommet adapted to extend through the at least one grommet hole and the at least one coupling hole.

8. The rodent barrier system of claim 1, comprising:
at least one flexible panel attachment structure comprises a coupling element adapted to engage at least one of the of the first and second flexible panel flanges; wherein each coupling element is adapted to secure a portion of one of the flexible panels to a portion of one of the rigid panels.

9. The rodent barrier system of claim 8 wherein the coupling element includes an adhesive element.

10. The rodent barrier system of claim 8 wherein the coupling element includes at least one hook-and-loop fastener.

11. The rodent barrier system of claim 1 wherein the first panel is made of high-density polyethylene.

12. The system of claim 1 wherein the each flexible panel has a stiffness in a dimension parallel to a first axis parallel to the first and second flexible panel edges that is at least four times a stiffness of the first flexible panel in a dimension perpendicular to the first axis.

13. The rodent barrier system of claim 1, in which the third flexible panel edge and the third rigid panel edge engage the ground to support the rodent barrier system in a desired orientation relative to the ground.

14. The rodent barrier system of claim 1, further comprising at least one structural brace adapted to engage the ground and at least one of the third flexible panel edge and the third rigid panel edge to support the rodent barrier system in a desired orientation relative to the ground.

15. The rodent barrier system of claim 1, in which the flexible panels and the rigid panels are connected to form a continuous loop surrounding the predefined area.

16. The rodent barrier system of claim 1, further comprising at least one grommet formed in at least one grommet hole formed in at least one of the first and second flexible panel flanges to allow utility access to the predefined area.

17. The rodent barrier system of claim 16, in which the at least one grommet hole is formed by removing at least one flexible panel attachment.

18. The rodent barrier system of claim 1, further comprising at least one grommet formed in at least one grommet hole formed in at least one of the first and second flexible panel flanges to allow utility access to the predefined area.

19. The rodent barrier system of claim 1, in which:
a first distance between each third flexible panel edge and the ground is predetermined to inhibit passage of rodents between each flexible panel and the ground;
a second distance between each third rigid panel edge and the ground is predetermined to inhibit passage of rodents between each flexible panel and the ground;
a third distance between each fourth flexible panel edge and the ground is redetermined to inhibit passage of rodents over each flexible panel;
a fourth distance between the fourth rigid panel edge and the ground is predetermined to inhibit passage of rodents over each rigid panel.

20. The system of claim 2 wherein the second panel is made of polypropylene.

* * * * *